Sept. 28, 1937.  O. W. YOUNG  2,094,252

ANTIFRICTION BEARING

Filed March 22, 1935

INVENTOR:
OTTO W. YOUNG,
BY
HIS ATTORNEY.

Patented Sept. 28, 1937

2,094,252

UNITED STATES PATENT OFFICE 2,094,252

ANTIFRICTION BEARING

Otto W. Young, East Orange, N. J., assignor to General Motors Corporation, Detroit, Mich., a corporation of Delaware Application March 22, 1935, Serial No. 12,462

7 Claims. (Cl. 308—213)

This invention relates to antifriction bearings and comprises all of the features of novelty herein disclosed. An object of the invention is to provide an improved self-contained bearing unit. Another object of the invention is to provide a bearing unit of great simplicity and capable of low cost production.

To these ends and also to improve generally upon devices of this character, the invention consists in the various matters hereinafter described and claimed. In its broader aspects, the invention is not necessarily limited to the specific constructions selected for illustrative purposes in the accompanying drawing in which Fig. 1 is a cross sectional view of a portion of a bearing.

Figure 1:
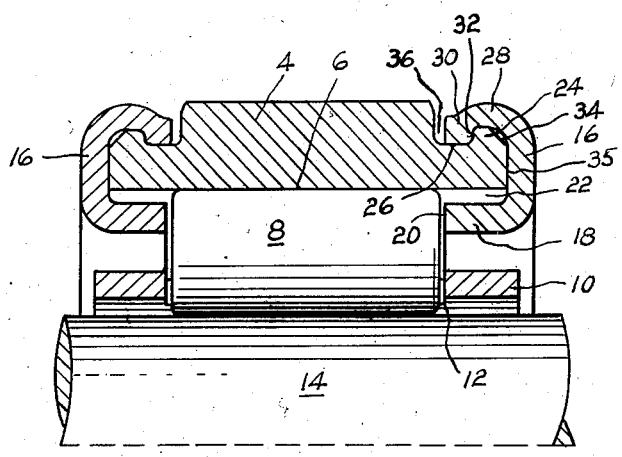

The numeral 4 indicates an outer race ring provided with a raceway 6 for a series of rolling elements 8. In the present instance, the raceway is cylindrical and the rollers are elongated cylinders having flat ends and a small radius at the corners. To hold the rollers assembled within the race ring 4 and keep them spaced, a separator or retainer 10 is provided. The retainer comprises a plain cylindrical sleeve with openings 12 for the rollers. The retainer is of smaller diameter than the circle through the centers of the rollers and the openings are narrower than the roller diameter so that the rollers can not escape radially inwards in the absence of a shaft 14 or other inner race member.

To guide the rollers and to limit endwise movement thereof, end rings or cap plates 16 are provided. Each is conveniently formed of channel cross section with a flange 18 extending axially within the race ring where it terminates in a flattened annular surface 20. Such surface may be coined flat or ground and is preferably hardened as by cyaniding the end ring. In order to bring the surface 20 away from the corner radius of the rollers and nearer to the centers of the rollers, the flange 18 is spaced from the race ring as indicated at 22 but this is not essential. The space between opposed surfaces 20 is preferably the same as, or a little smaller than, the distance between the ends of the roller openings 12 in the retainer. In order to secure the end rings 16 to the race ring, the latter is provided with annular projections 24 beyond annular grooves 26 while each end ring or cap plate has a flange 28 bent around the projection 24 with its annular terminal portion 30 spun into the groove. One side of the projection 24 provides an annular upright shoulder 32 parallel to the end of the race ring while the other side is bevelled off as at 34. The end ring or cap is preferably attached by spinning it into the groove, the annular terminal portion 30 being thereby forced laterally against the shoulder 32 and so pulling the ring portion 16 solidly against the end face 35 of the race ring 4, the bevel at 34 enabling the bend of the flange 28 to take its own radius. The groove 26 is wide enough to leave a clearance space at 36 so that the terminal portion 30 cannot engage the inner wall of the groove 26 in the spinning operation and so cause the ring to stretch and loosen its hold. The outer diameter of the flanges 28 is desirably smaller than the outside diameter of the race ring 4 to facilitate entering the bearing into a housing and to avoid load on the end caps.

Figure 2:
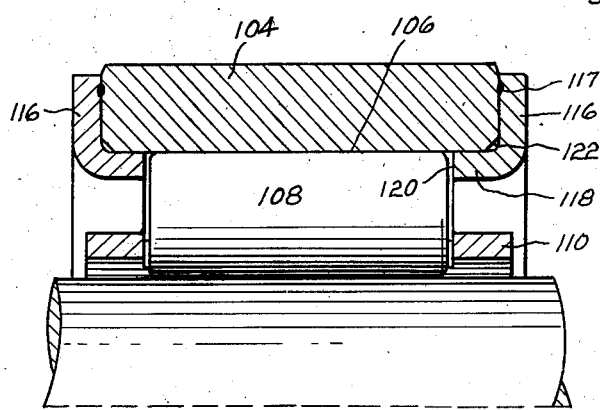
Fig. 2 is a similar view of a modified form of bearing.

In the modification shown in Fig. 2, the outer race ring 104 is a plain sleeve with a raceway 106 for rollers 108 having a retainer 110. Each end ring is angular in cross section with a flange 116 welded to the end of the race ring as in the region 117. A flange 118 extends axially along the raceway 106 and terminates in a flat annular surface 120. The race ring is preferably chamfered at 122 to clear the radius at the bend.

Figure 3:
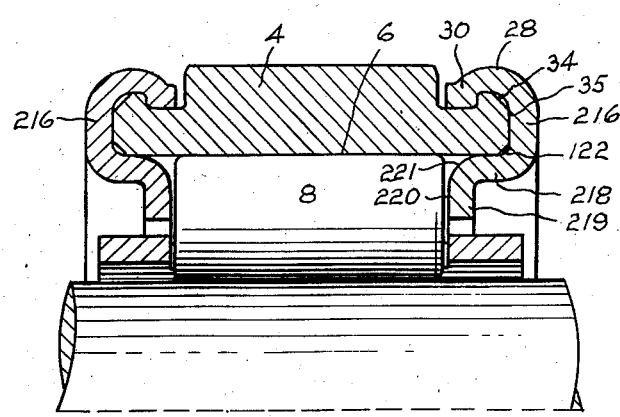
Fig. 3 is a similar view of another modified form.

In the modification shown in Fig. 3, each end ring or cap plate 216 has an axially extending flange 218 fitting within the race ring and terminating in an annular wall 219 which projects radially of the bearing to present a flat annular guiding face 220 to the rollers. The face 220 is desirably hardened and extends approximately to the centers of the rollers, a bend at 221 avoiding contact with the rollers near the circumference thereof. The outer portion of each end ring is attached to the race ring by spinning as in Fig. 1, the race ring having a chamfer at 122 to clear the bend as in Fig. 2.

In each of the foregoing forms, the raceway and the rollers are preferably hardened, as by carburizing. The rollers are of a form which can be cheaply produced, as by chopping them off from bar stock, end grinding, and tumbling to produce the small corner radius. While the separator or retainer lessens the number of rollers that can be used, the capacity of the bearing is great enough for many practical applications and the cost of the separator is less than that of the rollers eliminated. The separator further produces a better operating bearing when speed is an item.

Figure 4:
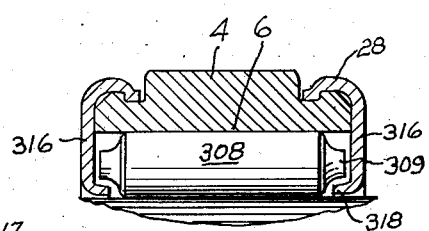
Fig. 4 is a cross sectional view of a bearing of full complement type and Fig. 5 is an enlarged view of a portion of said bearing.
Figure 5:
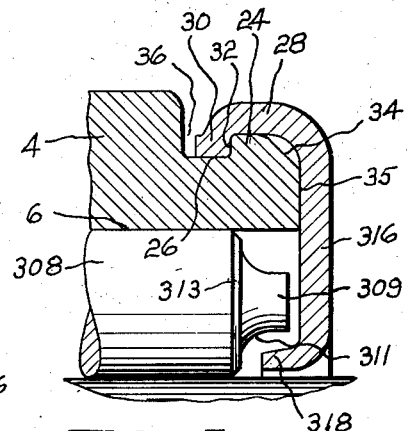

In Figs. 4 and 5, an outer race ring 4 has a raceway 6 for a full circular series of rolling elements 308 having projecting studs or extensions 309. The studs are flat at the ends and have a radiused portion 311 joining them to a chamfer 313 at the ends of the cylindrical portions of the rollers. End rings or cap plates 316 engage the end faces 35 of the race ring and project inwardly therefrom to limit endwise movement of the rollers by contact with the flat ends of the studs 309, and the end rings are preferably hardened as by cyaniding. At its inner periphery, each end ring has an axially directed flange 318 which thins down or tapers on the surface adjacent to the roller studs thus providing clearance for a large base-diameter of the rollers studs to contribute strength. The flanges 318 retain the rollers 308 in the outer race ring for handling. The race ring has an annular groove 26 with projections 24 beyond the grooves, each projection providing a nearly vertical shoulder 32 on one side and the other side being bevelled off as at 34, all as in Figs. 1 and 3, and the end ring or cap is preferably attached by spinning as in those figures.

I claim:

1. A self-contained bearing unit comprising an outer race ring, a series of rollers, a retainer having openings for the rollers and holding them outwardly within the race ring, end rings at opposite ends of the race ring, each end ring having a flange extending axially into the race ring between the race ring and the retainer, and the flange being spaced from the race ring and having an annular guide face opposed to the ends of the rollers for guiding contact therewith at a point removed from the outer race ring; substantially as described.

2. A self-contained bearing unit comprising an outer race ring having external grooves near the ends, a series of rollers, a retainer having openings for the rollers and holding them outwardly within the race ring, end rings at opposite ends of the race ring and having a channelled cross section, one flange of each channel being spun into one of the external grooves, another flange of the channel extending axially into the race ring between the race ring and the retainer, and the end of said other flange having a flat guide face opposed to and guiding the ends of the rollers; substantially as described.

3. A self-contained bearing unit comprising an outer race ring, a series of rollers, a retainer having openings for the rollers and holding them outwardly within the race ring, end rings secured at opposite ends of the race ring, each end ring having a flange extending axially into the race ring between the race ring and the retainer, and a wall extending radially from the end of the flange and presenting an annular guide face to the ends of the rollers; substantially as described.

4. A self-contained bearing unit comprising an outer race ring, a series of rollers, a retainer having openings for the rollers and holding them outwardly within the race ring, end rings secured at opposite ends of the race ring, each end ring having a flange extending axially into the race ring and engaging the inner wall thereof, an annular wall projecting radially from the flange towards the retainer, and the inner face of said wall having a curved portion near the peripheries of the rollers; substantially as described.

5. A self-contained bearing unit comprising a race ring and rolling elements, the race ring having an annular groove with an annular projection beyond the groove, the projection providing an annular upright shoulder for one wall of the groove, the outer side of the projection slanting towards the adjacent end of the race ring, and a cap plate for the end of the race ring and comprising a side wall extending across the end of the race ring, another portion being bent around the projection in clearance relation to the slanting side of the projection and having a terminal annulus pressed against the upright shoulder and holding the cap side wall solidly against the end of the race ring, another portion of the cap plate acting as a guide for the rolling elements; substantially as described.

6. A self-contained bearing unit comprising a race ring and rolling elements, the race ring having an annular groove with an annular projection beyond the groove, the projection providing an annular substantially radial shoulder for the outer wall of the groove, and a cap plate for the end of the race ring and comprising a side wall extending across the end of the race ring, another portion being bent around the projection and having a terminal annulus pressed laterally against the annular shoulder and holding the cap side wall solidly against the end of the race ring, and another portion of the cap plate extending inwardly and adapted for engagement with the rolling elements; substantially as described.

7. A self-contained bearing unit comprising a race ring and rolling elements, the race ring having an annular groove with an annular projection beyond the groove, the projection providing an annular substantially radial shoulder forming the outer wall of the groove and lying substantially parallel to one end of the race ring, and a cap plate for the end of the race ring and comprising a side wall extending across the end of the race ring, another portion being bent around the projection and having a terminal portion pressed against the shoulder and the bottom of the groove while clearing the opposite side wall of the groove, another portion of the cap plate extending inwardly and adapted for engagement with the rolling elements, and all portions of the cap plate being of smaller diameter than the race ring; substantially as described.

OTTO W. YOUNG.